US009631678B2

United States Patent
Tokito

(10) Patent No.: US 9,631,678 B2
(45) Date of Patent: Apr. 25, 2017

(54) CLUTCH APPARATUS

(71) Applicant: HONDA MOTOR CO., LTD., Tokyo (JP)

(72) Inventor: Akira Tokito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 31 days.

(21) Appl. No.: 14/667,613

(22) Filed: Mar. 24, 2015

(65) Prior Publication Data
US 2015/0275982 A1 Oct. 1, 2015

(30) Foreign Application Priority Data

Mar. 31, 2014 (JP) ................. 2014-073484

(51) Int. Cl.
F16D 13/56 (2006.01)

(52) U.S. Cl.
CPC ........ *F16D 13/56* (2013.01); *F16D 2013/565* (2013.01); *F16D 2300/24* (2013.01)

(58) Field of Classification Search
CPC .......... F16D 13/56; F16D 13/54; F16D 13/52; F16D 13/38; F16D 13/22; F16D 13/00; F16D 2300/24; F16D 2013/565; F16D 43/213; F16D 43/215; F16D 43/216
See application file for complete search history.

(56) References Cited

U.S. PATENT DOCUMENTS

| 2,337,135 | A | * | 12/1943 | Thelander | F16D 13/64 192/107 C |
| 3,765,513 | A | * | 10/1973 | Brooks | F16D 65/567 188/106 F |
| 4,157,135 | A | * | 6/1979 | Devlin | F16D 23/06 192/103 F |
| 4,375,254 | A | * | 3/1983 | Lech, Jr. | F16D 13/64 192/107 C |
| 5,222,574 | A | * | 6/1993 | Miller | B62D 53/025 180/14.4 |
| 9,157,488 | B2 | * | 10/2015 | Miyazaki | F16D 13/54 |
| 2011/0083934 | A1 | * | 4/2011 | Morone | F16D 13/75 192/70.11 |

(Continued)

FOREIGN PATENT DOCUMENTS

JP 2013-204749 10/2013

*Primary Examiner* — Jacob S Scott
*Assistant Examiner* — Lori Wu
(74) *Attorney, Agent, or Firm* — Mori & Ward, LLP

(57) ABSTRACT

A clutch apparatus includes a clutch outer, a clutch inner, driving friction plates, driven friction plates, a pressure receiving plate, a pressing plate, a movable cam member, a fixed cam member, clutch springs, and a swollen portion. The clutch outer is connected to an input power member. The clutch inner has a first ring plate portion extending along a plane perpendicular to an axial direction of an output power shaft and boss portions extending in the axial direction from the first ring plate portion. The clutch inner is connected to the output power shaft to rotate with the output power shaft. The driving friction plates are connected to the clutch outer. The swollen portion is provided at a base portion of each of the boss portions and swollen from opposite sides of each of the boss portions along a circumferential direction of the clutch inner.

20 Claims, 7 Drawing Sheets

(56) References Cited

U.S. PATENT DOCUMENTS

2013/0213761 A1* 8/2013 Franke ................ F16F 15/1206
                                                    192/30 V
2013/0256082 A1* 10/2013 Miyazaki ................ F16D 13/54
                                                    192/70.23

* cited by examiner

CLUTCH APPARATUS

CROSS-REFERENCE TO RELATED APPLICATIONS

The present application claims priority under 35 U. S. C. §119 to Japanese Patent Application No. 2014-073484, filed Mar. 31, 2014, entitled "Clutch Apparatus." The contents of this application are incorporated herein by reference in their entirety.

BACKGROUND OF THE INVENTION

Field of the Invention

The present invention relates to a clutch apparatus.

Discussion of the Background

A clutch apparatus which includes a cam mechanism which increases the contact pressure between a driving friction plate and a driven friction plate upon acceleration but decreases the contact pressure between the driving friction plate and the driven friction plate upon deceleration is known and disclosed in Japanese Patent Laid-Open No. 2013-204749.

SUMMARY OF THE INVENTION

According to one aspect of the present invention, a clutch apparatus includes a clutch outer, a clutch inner, a plurality of driving friction plates, a plurality of driven friction plates, a pressure receiving plate, a pressing plate, a movable cam member, a fixed cam member, a plurality of clutch springs, and a swollen portion. The clutch outer is connected to an input power member. The clutch inner has a first ring plate portion extending along a plane perpendicular to an axial line of an output power shaft and a plurality of boss portions extending in an axial direction from the first ring plate portion and is connected in an interlocking relationship to the output power shaft. The plurality of driving friction plates are configured to be engaged by the clutch outer. The plurality of driven friction plates are disposed alternately with the driving friction plates and configured to be engaged by the clutch inner. The pressure receiving plate is disposed in an opposing relationship to that one of the driving friction plates and the driven friction plates which is disposed at one end of the clutch inner along the axial direction and coupled to the clutch inner. The pressing plate cooperates with the pressure receiving plate to sandwich the driving friction plates and the driven friction plates therebetween. The movable cam member is spline-coupled to the clutch inner against relative rotation but for axial movement. The fixed cam member is fixed to the output power shaft so as to cooperate with the movable cam member to configure a cam mechanism and has a second ring plate portion which is opposed to the first ring plate portion and has a plurality of openings which are provided therein so as to allow the boss portions to penetrate the second ring plate portion therethrough. The plurality of clutch springs are provided between a spring receiving plate fixed to an end portion of the boss portions and the pressing plate and configured to bias the pressing plate so as to cooperate with the pressure receiving plate to contact the driving friction plates and the driven friction plates under pressure with each other therebetween. The swollen portion is provided integrally at a base portion of each of the boss portions in such a manner as to be swollen to opposite sides from the boss portion along a circumferential direction of the clutch inner such that, in a state in which a phase between the fixed cam member and the movable cam member is displaced from a correct phase, the swollen portion abuts with an end edge of the associated opening along a circumferential direction of the fixed cam member thereby to prevent insertion of the associated boss portion into the opening.

According to another aspect of the present invention, a clutch apparatus includes a clutch outer, a clutch inner, driving friction plates, driven friction plates, a pressure receiving plate, a pressing plate, a movable cam member, a fixed cam member, clutch springs, and a swollen portion. The clutch outer is connected to an input power member. The clutch inner has a first ring plate portion extending along a plane perpendicular to an axial direction of an output power shaft and boss portions extending in the axial direction from the first ring plate portion. The clutch inner is connected to the output power shaft to rotate with the output power shaft. The driving friction plates are connected to the clutch outer. The driven friction plates are connected to the clutch inner. The driving friction plates and the driven friction plates are disposed alternately in the axial direction. The pressure receiving plate is coupled to the clutch inner and disposed to face one of the driving friction plates and the driven friction plates in the axial direction. The one is disposed at one end of the clutch inner along the axial direction. The pressing plate is provided to sandwich the driving friction plates and the driven friction plates between the pressing plate and the pressure receiving plate in the axial direction. The movable cam member is spline-coupled to the clutch inner such that the movable cam member move in the axial direction and do not rotate with respect to the clutch inner. The fixed cam member is fixed to the output power shaft so as to cooperate with the movable cam member to constitute a cam mechanism and has a second ring plate portion which faces the first ring plate portion in the axial direction and has openings through which the boss portions pass in the axial direction. The clutch springs are provided between a spring receiving plate fixed to an end portion of the boss portions in the axial direction and the pressing plate and configured to press the pressing plate such that the driving friction plates and the driven friction plates contact to each other under pressure between the pressing plate and the pressure receiving plate. The swollen portion is provided at a base portion of each of the boss portions and swollen from opposite sides of each of the boss portions along a circumferential direction of the clutch inner such that the swollen portion of an associated boss portion among the boss portions abuts with an end edge of an associated opening among the openings along a circumferential direction of the fixed cam member to prevent insertion of the associated boss portion into the associated opening in a state in which a phase between the fixed cam member and the movable cam member is displaced from a correct phase.

BRIEF DESCRIPTION OF THE DRAWINGS

A more complete appreciation of the invention and many of the attendant advantages thereof will be readily obtained as the invention becomes better understood by reference to the following detailed description when considered in connection with the accompanying drawings.

DESCRIPTION OF THE EMBODIMENTS

Figure 1:
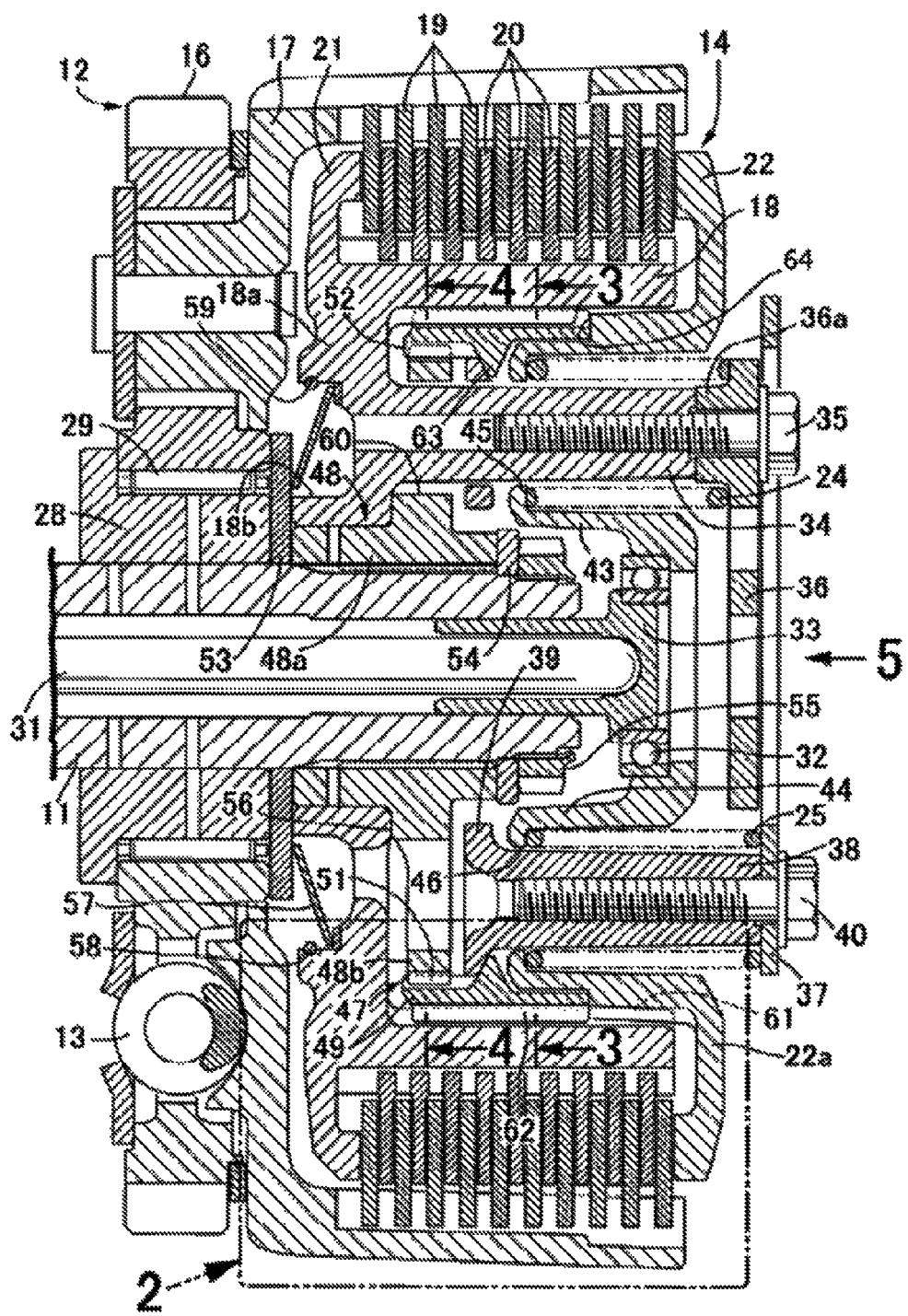
FIG. 1 is a sectional view of a clutch apparatus.

The embodiments will now be described with reference to the accompanying drawings, wherein like reference numerals designate corresponding or identical elements throughout the various drawings.

In the following, an embodiment of the present invention is described with reference to the accompanying drawings.

Figure 2:
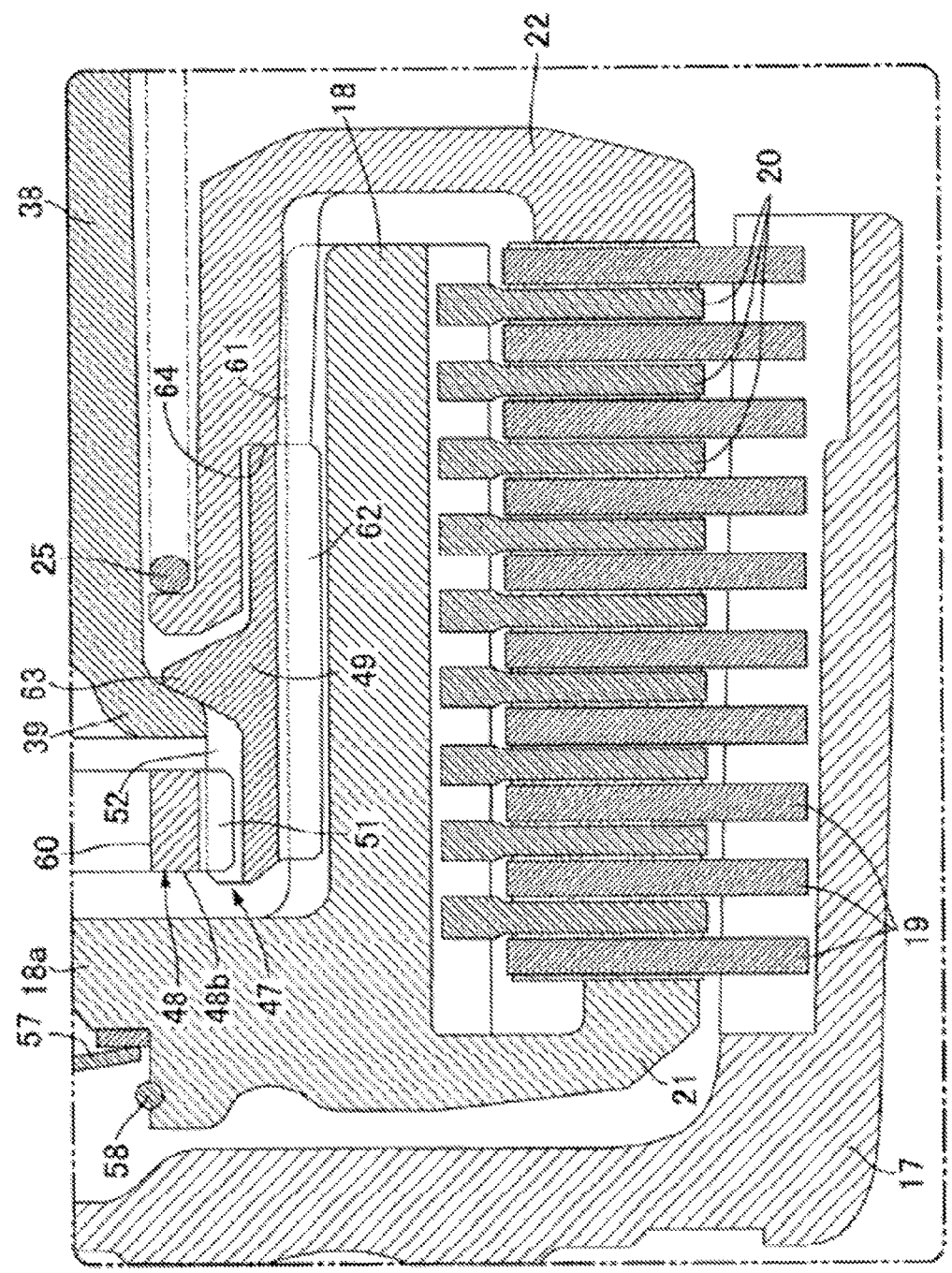
FIG. 2 is an enlarged view of a portion of FIG. 1 indicated by an arrow mark 2.

First, referring to FIGS. 1 and 2, a primary reduction gear 12, a damper spring 13, and a clutch apparatus 14 are interposed between a crankshaft (not depicted) of an engine incorporated, for example, in a motorcycle and a main shaft 11 of a gear transmission (not depicted). The primary reduction gear 12 is configured from a primary driving gear (not depicted) provided on the crankshaft and a primary driven gear 16 which meshes with the primary driving gear. The primary driven gear 16 is supported for relative rotation on the main shaft 11.

The clutch apparatus 14 is configured as a multi-plate clutch apparatus and includes a clutch outer 17, a clutch inner 18, a plurality of driving friction plates 19, a plurality of driven friction plates 20, a pressure receiving plate 21, a pressing plate 22, and a plurality of e.g., three of each of) first and second clutch springs 24 and 25. The clutch outer 17 is coupled in an interlocking relationship to the primary driven gear 16, which serves as an input power member, through the damper spring 13. The clutch inner 18 is coupled to and interlocked with the main shaft 11 which serves as an output power member. The driving friction plates 19 are engaged against relative rotation with the clutch outer 17. The driven friction plates 20 are placed alternately with the driving friction plates 19 and engaged against relative rotation with the clutch inner 18. The pressure receiving plate 21 is disposed in an opposing relationship to that one of the driving friction plates 19 which is disposed at one end along an axial direction of the clutch inner 18 from among the driving friction plates 19 and the driven friction plates 20. The pressing plate 22 cooperates with the pressure receiving plate 21 to sandwich the driving friction plates 19 and the driven friction plates 20 therebetween. The first and second clutch springs 24 and 25 exert spring biasing force for biasing the pressing plate 22 so as to cooperate with the pressure receiving plate 21 to press the driving friction plates 19 and the driven friction plates 20 under pressure against each other.

On an outer periphery of a portion of the main shaft 11 which corresponds to the primary reduction gear 12, a cylindrical sleeve 28 is fitted such that it has a fixed direction along an axial line of the main shaft 11. A needle bearing 29 is interposed between an outer circumference of the sleeve 28 and an inner circumference of the primary driven gear 16.

The clutch outer 17 is formed in the shape of a bowl open to the opposite side to the primary driven gear 16 and is connected to the primary driven gear 16 through the damper spring 13. Further, the driving friction plates 19 engage at an outer circumference thereof with an inner circumference of the clutch outer 17 so as to allow movement thereof in an axial direction but disable relative rotation to the latter.

The clutch inner 18 is formed in a cylindrical shape such that it is disposed coaxially in the clutch outer 17, and the driven friction plates 20 engage with an outer circumference of the clutch inner 18 so as to allow movement thereof in the axial direction but disable relative rotation to the latter. The pressure receiving plate 21 is disposed at a position at which it is interposed between the clutch outer 17 and the clutch inner 18. The clutch inner 18 is coupled at one end thereof integrally to the pressure receiving plate 21.

Incidentally, an operation shaft 31 is inserted for axial movement in the main shaft 11. Meanwhile, the pressing plate 22 is supported at an inner circumference thereof by a bearing receiving member 33 through a clutch bearing 32. The operation shaft 31 can abut at an end portion thereof with the bearing receiving member 33. Thus, if the bearing receiving member 33 is pushed by the operation shaft 31, then the pressing plate 22 is displaced to the side away from the pressure receiving plate 21. Consequently, the clutch apparatus 14 is placed into a disconnection state.

Figure 3:
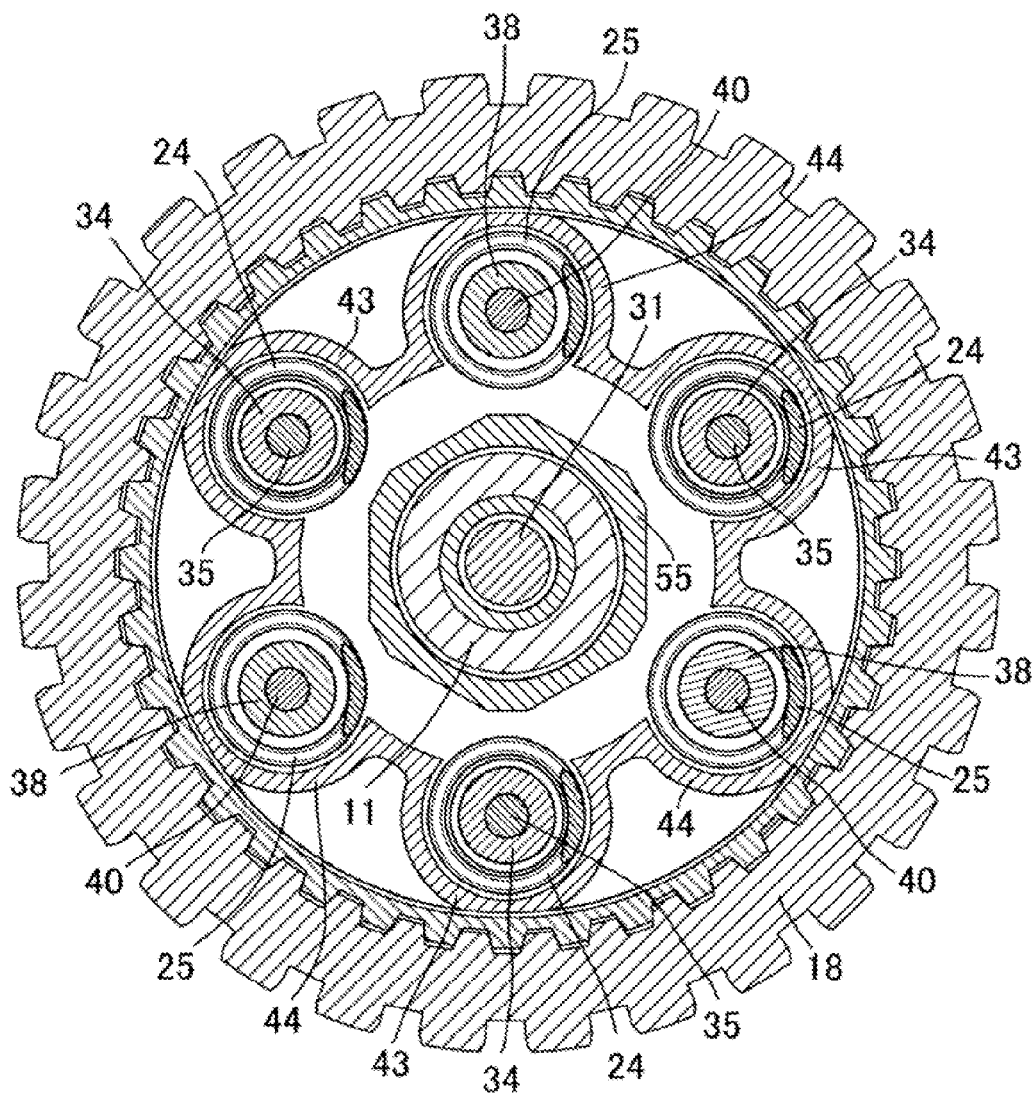
FIG. 3 is a sectional view taken along line 3-3 of FIG. 1.
Figure 4:
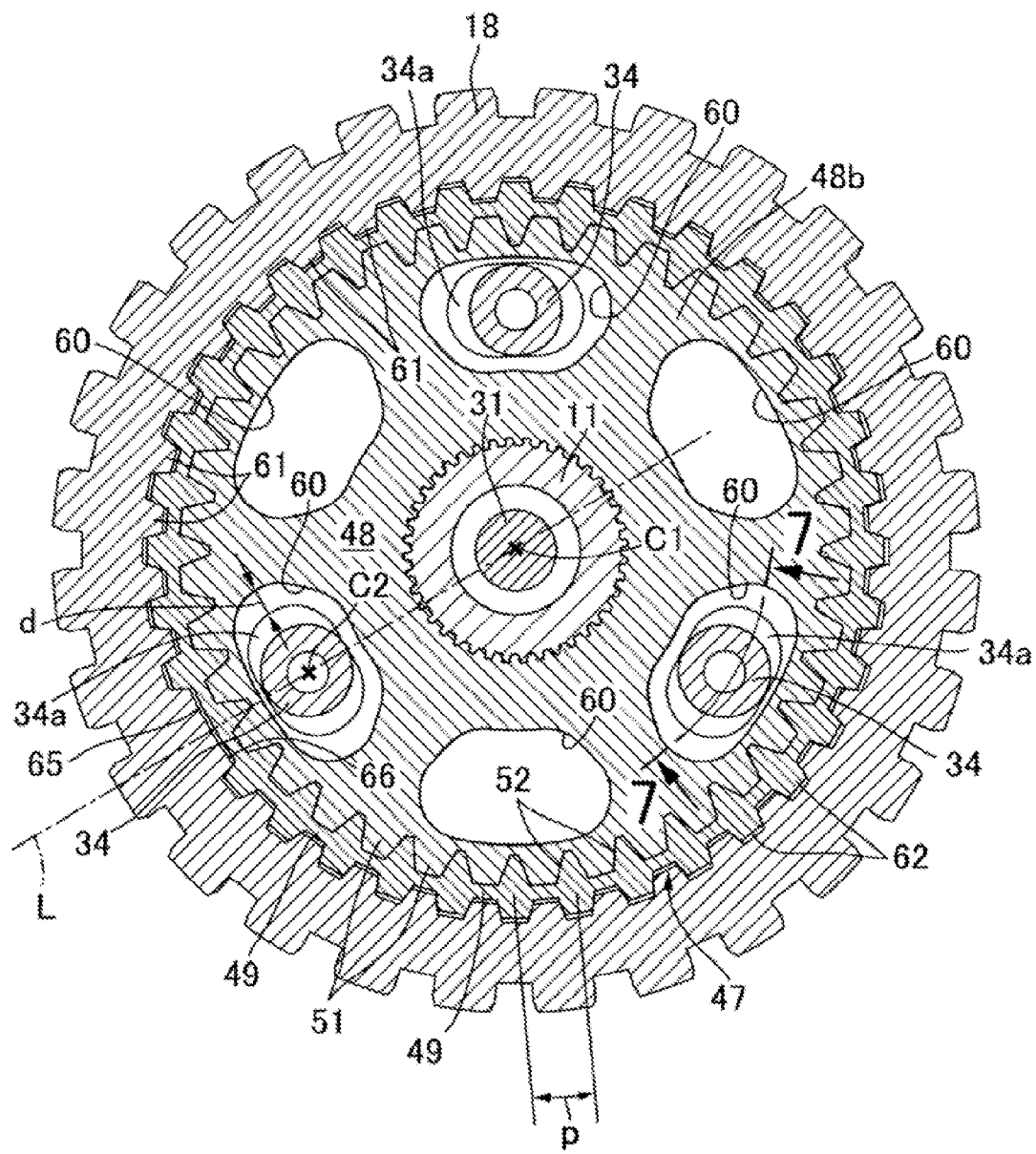
FIG. 4 is a sectional view taken along line 4-4 of FIG. 1.

Referring to FIGS. 3 and 4, the clutch inner 18 has a first ring plate portion 18a extending along a plane perpendicular to the axial line of the main shaft 11. A first boss portion 34 of a cylindrical shape is provided at a plurality of locations, in the present embodiment, at three locations, equidistantly spaced from each other in a circumferential direction of the clutch inner 18. The first boss portions 34 extend in the axial direction through the pressing plate 22. The first boss portions 34 are inserted in the first clutch springs 24 each in the form of a coil spring, and a first spring receiving plate 36 is fixed to an end portion of the first boss portions 34 by a bolt 35 screwed in each of the first boss portions 34. Besides, a cylindrical projection 36a is provided in a projecting manner on the first spring receiving plate 36 such that it abuts with an end of each of the first boss portions 34, and the first clutch springs 24 are provided between the first spring receiving plate 36 and the pressing plate 22.

A plurality of, for example, three, second clutch springs 25 are disposed in an equidistantly spaced relationship from each other in a circumferential direction of the clutch inner 18 at middle locations between the first clutch springs 24. The second clutch springs 25 are coil springs provided in a compressed state between the pressing plate 22 and a second spring receiving plate 37. Second boss portions 38 of a cylindrical shape are disposed in parallel to the clutch inner 18 in the clutch inner 18 and connected at a base end portion thereof integrally by an annular plate portion 39. The second spring receiving plate 37 is fixed to an end portion of the second boss portions 38, which extend through the pressing plate 22, by a bolt 40 screwed in each of the second boss portions 38.

Figure 5:
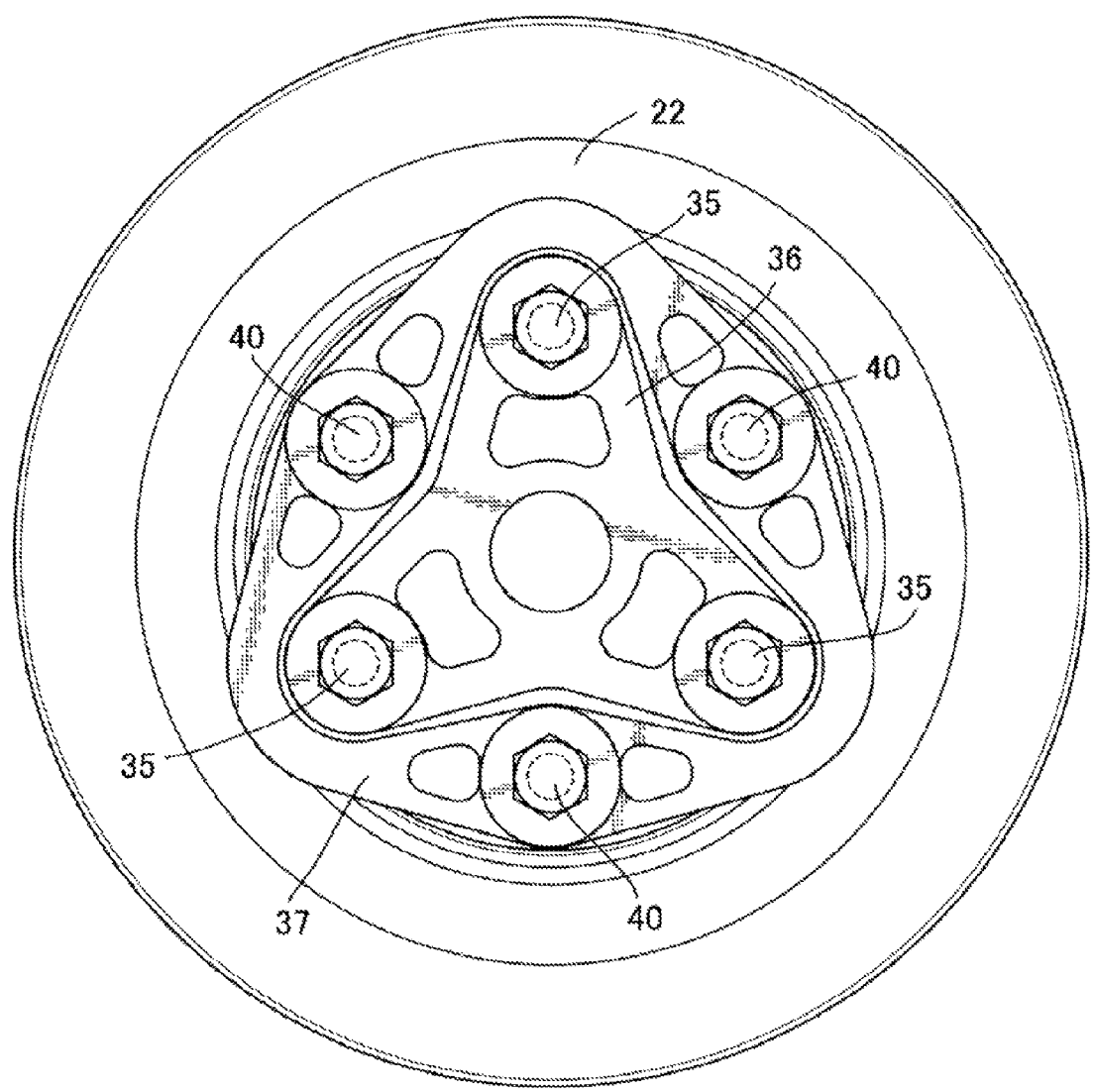
FIG. 5 is a view of a portion of FIG. 1 indicated by an arrow mark 5.

Referring also to FIG. 5, the second spring receiving plate 37 is formed such that it surrounds the first spring receiving plate 36 as viewed in the axial direction and partly overlaps with the pressing plate 22. Besides, the second spring receiving plate 37 is disposed on the outer side with respect to an axially outer side end face 22a of the pressing plate 22 and is formed with a thickness reduced from that of the first spring receiving plate 36.

The pressing plate 22 has a first spring accommodation portion 43 of a bottomed cylindrical shape and a second spring accommodation portion 44 of a bottomed cylindrical shape integrally. The first spring accommodation portion 43 is provided at each of three places equidistantly spaced from each other in a circumferential direction of the pressing plate 22 and projects toward the first ring plate portion 18a side of the clutch inner 18. The second spring accommodation portion 44 is provided at each of three places equidistantly spaced from each other in the circumferential direction of the pressing plate 22 and project toward the first ring plate portion 18a side. The second spring accommodation portions 44 are disposed between adjacent ones of the first spring accommodation portions 43. Insertion holes 45 and 46 are provided at a closed end of the first and second spring accommodation portions 43 and 44.

The first clutch springs 24 are accommodated in the first spring accommodation portions 43 such that they are compressed between the closed end of the first spring accommodation portions 43 and the first spring receiving plate 36. Further, a second clutch spring 25 is accommodated in each of the second spring accommodation portions 44 such that it is compressed between the closed end of the second spring accommodation portion 44 and the second spring receiving plate 37. The first boss portions 34 are inserted in the insertion holes 45 of the first spring accommodation portions 43 in which the first clutch springs 24 are accommodated. Further, the second boss portions 38 are inserted in the insertion holes 46 of the second spring accommodation portions 44 in which the second clutch springs 25 are accommodated.

Besides, the first clutch springs 24 are formed with a large diameter from a wire material thicker than that of the second clutch springs 25 and have a free length in the axial direction smaller than that of the second clutch springs 25. The inner diameter of the first spring accommodation portions 43 is set greater than that of the second spring accommodation portions 44. Meanwhile, the inner diameter of the second spring accommodation portions 44 is set such that it is impossible to accommodate the first clutch springs 24 in the second spring accommodation portions 44. Consequently, the first clutch springs 24 are prevented from being accommodated into the second spring accommodation portions 44 in error, and erroneous assembly of the first and second clutch springs 24 and 25 can be prevented.

A cam mechanism 47 is provided between the clutch inner 18 and the main shaft 11. The cam mechanism 47 is configured from a fixed cam member 48 and a movable cam member 49. The fixed cam member 48 is fixed to the main shaft 11. The movable cam member 49 has, on an inner circumference thereof, cam teeth 52 which engage with cam teeth 51 each in the form of a helical tooth provided on an outer circumference of the fixed cam member 48. The movable cam member 49 is engaged by the fixed cam member 48.

The fixed cam member 48 is formed such that it integrally has a cylindrical portion 48a and a second ring plate portion 48b. The cylindrical portion 48a is spline-fitted with the main shaft 11. The second ring plate portion 48b is swollen outwardly in a radial direction from an intermediate portion of the cylindrical portion 48a in the axial direction such that it is disposed between the first ring plate portion 18a of the clutch inner 18 and the annular plate portion 39. A nut 55 cooperates with the sleeve 28 and the primary driven gear 16 to sandwich a ring washer 53, the cylindrical portion 48a, and another ring washer 54 therebetween and is screwed with an end portion of the main shaft 11 to fix the fixed cam member 48 to the main shaft 11.

The first ring plate portion 18a of the clutch inner 18 is fitted for relative rotation with the cylindrical portion 48a of the fixed cam member 48 such that an inner circumferential portion thereof is disposed between the second ring plate portion 48b and the ring washer 54. An annular concave portion 18b is formed on a face of the inner peripheral portion of the first ring plate portion 18a which faces the clutch outer 17 side. An annular receiving face 56 is formed on an inner circumferential portion of the second ring plate portion 48b of the fixed cam member 48 such that it faces one side along the axial direction of the clutch inner 18. A disc spring 57 for pressing the first ring plate portion 18a against the annular receiving face 56 is accommodated in the annular concave portion 18b such that a large diameter end thereof abuts with the first ring plate portion 18a. Meanwhile, a small diameter portion of the disc spring 57 abuts with the ring washer 53. In other words, the disc spring 57 and the ring washer 54, which is interposed between the disc spring 57 and the clutch outer 17, are provided between opposing portions of the first ring plate portion 18a of the clutch inner 18 and the clutch outer 17. Besides, the biasing force of the disc spring 57 is set higher than the spring biasing force exerted by the first and second clutch springs 24 and 25. Further, an annular mounting groove 59 is formed on a side face on the outer periphery side of the annular concave portion 18b, and a clip 58 is mounted on the clutch inner 18 such that it is fitted in the mounting groove 59. The clip 58 prevents the disc spring 57 from being removed from the clutch inner 18.

An opening 60 in the form of an elongated hole is provided in the second ring plate portion 48b of the fixed cam member 48. The opening 60 is disposed at each of six places equidistantly spaced from each other in the circumferential direction and is elongated in the circumferential direction. The first boss portions 34 are inserted in three ones of the six openings 60.

The cam teeth 51 of the fixed cam member 48 are provided on an outer circumference of the second ring plate portion 48b of the fixed cam member 48. Meanwhile, the movable cam member 49 is disposed coaxially in the clutch inner 18. The cam teeth 52 are provided on the inner circumference of the movable cam member 49 such that the engage with the cam teeth 51 of the fixed cam member 48. Besides, the cam teeth 51 and 52 are formed as a helical tooth so that when the clutch inner 18 makes accelerated rotation, the movable cam member 49 is moved to one side (to the left side in FIG. 1) along the axial direction of the clutch inner 18.

Figure 6:
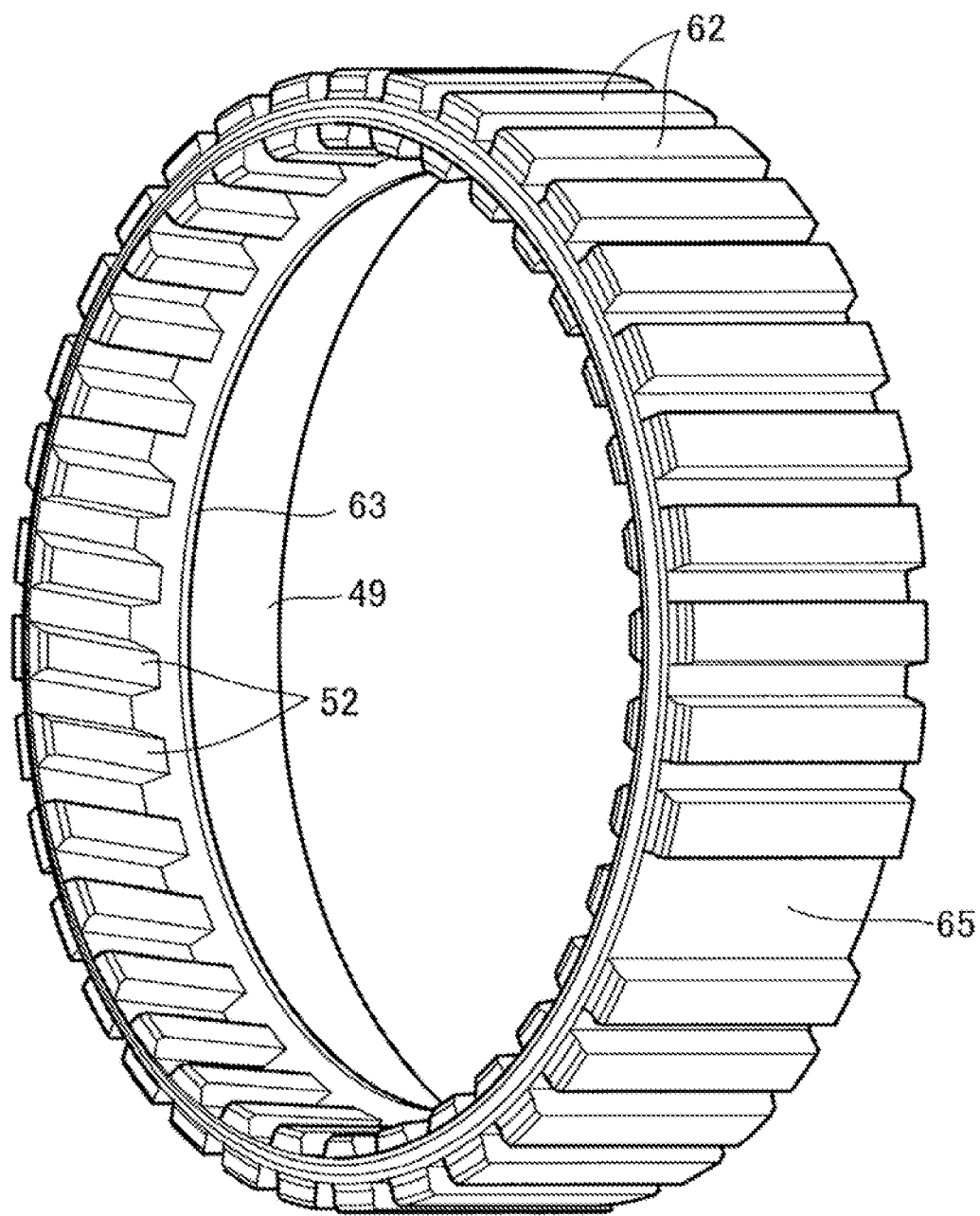
FIG. 6 is a perspective view of a movable cam member.

Referring also to FIG. 6, the outer circumference of the movable cam member 49 is spline-engaged with the inner circumference of the clutch inner 18 for relative rotation in the axial direction but against relative rotation around the axial line. Upon accelerated rotation of the clutch inner 18, the cam mechanism 47 moves the movable cam member 49 to one side in the axial direction of the clutch inner 18 independently of the clutch inner 18. The length of the inner circumference of the movable cam member 49 in the axial direction of the cam teeth 52 is set smaller than the length in the axial direction of spline teeth 62 provided over the overall length of the outer circumference of the movable cam member 49 such that the cam teeth 52 are spline-engaged with spline teeth 61 provided on the inner circumference of the clutch inner 18.

An annular engaging portion 63 is provided in a projecting manner on the inner circumference at an intermediate portion of the movable cam member 49. When the movable cam member 49 moves to one side in the axial direction of the clutch inner 18 in response to accelerated rotation of the clutch inner 18, the engaging portion 63 is engaged with an outer circumferential portion of the annular plate portion 39 to move the second spring receiving plate 37 to compress the second clutch springs 25. The end of the movement of the annular plate portion 39 to compress the second clutch springs 25 is restricted by abutment of the annular plate portion 39 with the fixed cam member 48 fixed to the main shaft 11 at a position opposing to the annular plate portion 39.

On an outer side outer circumference which extends along a radial direction of the clutch inner 18 from within the outer circumference of the first and second spring accommodation portions 43 and 44 provided on the pressing plate 22, a pressure receiving face 64 is formed such that it can be abutted by an end portion of the movable cam member 49 on the pressing plate 22 side.

When the driving force from the main shaft 11 exceeds the driving force from the primary driven gear 16 to generate back torque, the cam mechanism 47 moves the movable cam member 49 to the other side (to the right side in FIG. 1) along the axial direction of the clutch inner 18 toward the pressing plate 22. Along with this, the end portion of the movable cam member 49 on the pressing plate 22 side is placed into abutment with the pressure receiving face 64 of the pressing plate 22 to press the pressing plate 22 away from the pressure receiving plate 21 against the spring force of the first and second clutch springs 24 and 25. Consequently, the contact pressure between the driving friction plates 19 and the driven friction plates 20 is suppressed.

Figure 7:
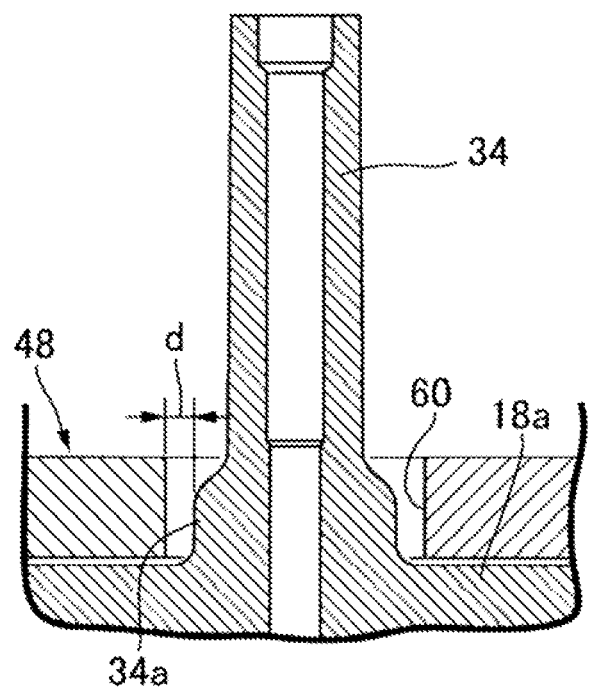
FIG. 7 is a sectional view taken along line 7-7 of FIG. 4.

Referring also to FIG. 7, a swollen portion 34a is provided integrally at a base portion of the first boss portions 34 such that it is swollen from the first boss portions 34 to the opposite sides along a circumferential direction of the clutch inner 18. In a state in which the phase between the fixed cam member 48 and the movable cam member 49 is displaced from a correct phase, the swollen portion 34a is abutted with an end edge of the openings 60 extending along a circumferential direction of the fixed cam member 48 thereby to prevent insertion of the first boss portions 34 into the openings 60.

As depicted in FIG. 4, a toothless portion 65 is provided on one of the clutch inner 18 and the movable cam member 49. The toothless portion 65 is formed by cutting out part of the spline teeth 61 and 62 for allowing spline-coupling between the clutch inner 18 and the movable cam member 49. On the other one of the clutch inner 18 and the movable cam member 49, an increased width tooth 66 having an increased width in the circumferential direction is provided so as to mesh with the toothless portion 65. In the present embodiment, the toothless portion 65 is provided on the movable cam member 49 while the increased width tooth 66 is provided on the clutch inner 18.

Besides, the toothless portion 65 is provided on the movable cam member 49 such that it is positioned on a straight line L interconnecting the center C1 of the fixed cam member 48 and the center C2 of one of the openings 60. The toothless portion 65, increased width tooth 66, center of the first boss portions 34, and center of one of the openings 60 are set such that, in a state in which the relative phase of the fixed cam member 48 and the movable cam member 49 is in a particular state, they are juxtaposed on the same straight line L.

A distance d in the circumferential direction between an end edge of each of the openings 60 along the fixed cam member 48 and the associated swollen portion 34a in a state in which the associated first boss portion 34 is disposed at the center C2 of the opening 60 is set smaller than a circumferential pitch p of the spline teeth 62 which allow spline-coupling between the clutch inner 18 and the movable cam member 49.

Further, the swollen portion 34a is formed such that it avoids, in a state in which the first boss portion 34 is inserted in the opening 60 and the fixed cam member 48 is assembled to the clutch inner 18 together with the movable cam member 49, projection thereof from the second ring plate portion 48b of the fixed cam member 48 to the opposite side to the first ring plate portion 18a of the clutch inner 18.

Now, operation of the present embodiment is described. The fixed cam member 48 is fixed to the main shaft 11 so as to configure the cam mechanism 47 together with the movable cam member 49 spline-coupled against relative rotation but for axial movement to the clutch inner 18 and has the second ring plate portion 48b opposing to the first ring plate portion 18a of the clutch inner 18. Further, the first boss portions 34 provided on the first ring plate portion 18a so as to extend in the axial direction extend through the openings 60 provided in the second ring plate portion 48b. Here, the swollen portion 34a is provided integrally at the base portion of the first boss portions 34 in such a manner as to be swollen to the opposite sides from the first boss portion 34 along the circumferential direction of the clutch inner 18 such that the swollen portion 34a is abutted, in a state in which the phase between the fixed cam member 48 and the movable cam member 49 is displaced from the correct phase, with the end edge of the associated opening 60 extending in the circumferential direction of the fixed cam member 48 thereby to prevent insertion of the first boss portion 34 into the opening 60. Therefore, when the phase between the fixed cam member 48 and the movable cam member 49 is displaced from the correct phase, the swollen portion 34a is abutted with the end edge of the opening 60 along the circumferential direction of the fixed cam member 48 to prevent insertion of the first boss portion 34 into the opening 60. Consequently, erroneous assembly can be let known to the worker, by which the workability is improved.

Further, the toothless portion 65 which is formed by cutting out part of the plural spline teeth 61 and 62 for allowing spline-coupling between the clutch inner 18 and the movable cam member 49 is provided on one of the clutch inner 18 and the movable cam member 49. Meanwhile, the increased width tooth 66 having a width increased in the circumferential direction is provided on the other one of the clutch inner 18 and the movable cam member 49 such that it meshes with the toothless portion 65. Therefore, assembly wherein the phase of the movable cam member 49 and the clutch inner 18 in the direction of rotation is correct can be carried out, which facilitates the assembly operation.

Further, the toothless portion 65 is provided on the movable cam member 49 so as to be positioned on the straight line L interconnecting the center 01 of the fixed cam member 48 and the center C2 of one of the openings 60. Therefore, when the fixed cam member 48 is assembled to the movable cam member 49, the worker can confirm readily that the phase in the direction of rotation is correct, which facilitates the assembly operation.

Further, in the state in which the relative phase of the fixed cam member 48 and the movable cam member 49 is the predetermined phase, the toothless portion 65, increased width tooth 66, center of a first boss portion 34, and center C2 of one of the openings 60 are set so as to be juxtaposed on the same straight line L. Therefore, the worker can visually recognize that the phase of the cam mechanism 47 in the assembled state of the clutch apparatus 14 is correct, which further facilitates the assembly operation.

Further, the distance d along the circumferential direction between the end edge of an opening 60 along the circumferential direction of the fixed cam member 48 and a first boss portion 34 in the state in which the first boss portions 34 is disposed on the center C2 of the opening 60 is set smaller than the circumferential pitch p of the spline teeth 61 and 62 for allowing spline-coupling between the clutch inner 18 and the movable cam member 49. Therefore, even if a phase displacement smaller than the circumferential pitch p of the spline teeth 61 and 62 for allowing the spline-coupling between the clutch inner 18 and the movable cam member 49 appears between the fixed cam member 48 and the clutch inner 18, assembly of the fixed cam member 48 to the clutch inner 18 side cannot be carried out. Therefore, erroneous assembly can be let known to the worker, resulting in improvement in operability.

Further, the swollen portion 34a is formed such that it avoids, in the state in which the fixed cam member 48 is assembled to the clutch inner 18 together with the movable cam member 49 with the first boss portions 34 inserted in the openings 60, projection thereof from the second ring plate portion 48b of the fixed cam member 48 to the opposite side to the first ring plate portion 18a. Therefore, even if a member (in the present embodiment, the annular plate portion 39) which is disposed on the opposite side to the first ring plate portion 18a with respect to the second ring plate portion 48b is disposed in the proximity of the second ring plate portion 48b, it does not interfere with the swollen portion 34a. This can contribute to compactification of the clutch apparatus 14 in the axial direction.

Further, on the annular plate portion 39 disposed for movement in response to movement of the movable cam member 49 by accelerated rotation of the clutch inner 18 and opposed to the second ring plate portion 48b of the fixed cam member 48 from the opposite side to the first ring plate portion 18a, the plural second boss portions 38 are disposed between the first boss portions 34 in the circumferential direction of the pressing plate 22 and provided so as to penetrate the pressing plate 22 in the axial direction. Further, the second spring receiving plate 37 disposed on the outer side with respect to the axially outer side end face 22a of the pressing plate 22 and formed so as to partly overlap with the pressing plate 22 and surround the first spring receiving plate 36 as viewed in the axial direction is fixed to the end of the second boss portions 38. Further, the second clutch springs 25 are provided between the second spring receiving plate 37 and the pressing plate 22 so as to bias the pressing plate 22 to cooperate with the pressure receiving plate 21 to press the driving friction plates 19 and the driven friction plates 20 under pressure against each other. Therefore, even if the worker tries to assemble the second spring receiving plate 37 to the first boss portions 34 of the clutch inner 18 in error, the second spring receiving plate 37 is abutted with the pressing plate 22 to prevent the assembly. Therefore, the erroneous assembly can be let known to the worker, resulting in improvement in operability.

Further, even if it is tried to assemble the first spring receiving plate 36 to the second boss portions 38, since the first spring receiving plate 36 is thicker than the second spring receiving plate 37 and besides the axial free length of the second clutch springs 25 is greater than that of the first clutch springs 24, the end of the bolts 40 does not reach an end portion of the second boss portions 38, which makes the assembly difficult. Therefore, assembly in error can be let known to the worker.

Further, the cylindrical projection 36a is provided in a projecting manner on the first spring receiving plate 36 fixed to the end of the first boss portions 34 such that it is abutted with the end of a first boss portion 34. Therefore, combination of the parts, namely, of the first spring receiving plate 36 and the first boss portions 34, can be confirmed with the eyes, resulting in improvement in operability.

Furthermore, the disc spring 57 and the ring washer 53 which is interposed between the disc spring 57 and the clutch outer 17 are provided between the opposing portions of the first ring plate portion 18a of the clutch inner 18 and the clutch outer 17. Therefore, fluttering in the axial direction of the clutch inner 18 and the clutch outer 17 can be suppressed. Further, since the clip 58 for preventing removal of the disc spring 57 from the clutch inner 18 is mounted on the clutch inner 18. Therefore, it can be prevented by the clip 58 that the disc spring 57 drops when the assembly including the clutch inner 18 is to be assembled to the clutch outer 17 side.

While the embodiment of the present invention has been described, the present invention is not limited to the embodiment described above, but various design changes can be carried out without departing from the present invention defined in the claims.

According to the embodiment of the present invention, there is provided a clutch apparatus which has a first characteristic in that clutch apparatus includes a clutch outer connected to an input power member, a clutch inner having a first ring plate portion extending along a plane perpendicular to an axial line of an output power shaft and a plurality of boss portions extending in an axial direction from the first ring plate portion and connected in an interlocking relationship to the output power shaft, a plurality of driving friction plates configured to be engaged by the clutch outer, a plurality of driven friction plates disposed alternately with the driving friction plates and configured to be engaged by the clutch inner, a pressure receiving plate disposed in an opposing relationship to that one of the driving friction plates and the driven friction plates which is disposed at one end of the clutch inner along the axial direction and coupled to the clutch inner, a pressing plate cooperating with the pressure receiving plate to sandwich the driving friction plates and the driven friction plates therebetween, a movable cam member spline-coupled to the clutch inner against relative rotation but for axial movement, a fixed cam member fixed to the output power shaft so as to cooperate with the movable cam member to configure a cam mechanism and having a second ring plate portion which is opposed to the first ring plate portion and has a plurality of openings which are provided therein so as to allow the boss portions to penetrate the second ring plate portion therethrough, and a plurality of clutch springs provided between a spring receiving plate fixed to an end portion of the boss portions and the pressing plate and configured to bias the pressing plate so as to cooperate with the pressure receiving plate to contact the driving friction plates and the driven friction plates under pressure with each other therebetween, a swollen portion being provided integrally at a base portion of each of the boss portions in such a manner as to be swollen to opposite sides from the boss portion along a circumferential direction of the clutch inner such that, in a state in which a phase between the fixed cam member and the movable cam member is displaced from a correct phase, the swollen portion abuts with an end edge of the associated opening along a circumferential direction of the fixed cam member thereby to prevent insertion of the associated boss portion into the opening.

Further, according to the embodiment of the present invention, the clutch apparatus has a second characteristic in that, in addition to the configuration of the first characteristic, a toothless portion is provided on one of the clutch inner and the movable cam member by cutting out part of a plurality of spline teeth for allowing spline-coupling of the clutch inner and the movable cam member to each other, and an increased width tooth is provided on the other of the clutch inner and the movable cam member and has an increased width in the circumferential direction so as to mesh with the toothless portion.

Further, according to the embodiment of the present invention, the clutch apparatus has a third characteristic in that, in addition to the configuration of the second characteristic, the toothless portion is provided on the movable cam member so as to be positioned on a straight line interconnecting a center of the fixed cam member and a center of one of the openings.

Further, according to the embodiment of the present invention, the clutch apparatus has a fourth characteristic in that, in addition to the configuration of the third characteristic, the toothless portion, increased width tooth, center of the boss portions, and center of one of the openings are set so as to be juxtaposed on the same straight line in a state in which the fixed cam member and the movable cam member have a predetermined relative phase therebetween.

Further, according to the embodiment of the present invention, the clutch apparatus has a fifth characteristic in that, in addition to the configuration of any one of the first to fourth characteristics, a distance between an end edge of each of the openings along a circumferential direction of the fixed cam member and the associated swollen portion in a state in which the boss portions is disposed on the center of the opening along the circumferential direction is set smaller than a circumferential pitch of a plurality of spline teeth for allowing spline-coupling between the clutch inner and the movable cam member.

Further, according to the embodiment of the present invention, the clutch apparatus has a sixth characteristic in that, in addition to the configuration of any one of the first to fifth characteristics, the swollen portion is formed so as not to project to an opposite side to the first ring plate portion from the second ring plate portion of the fixed cam member in a state in which the fixed cam member is assembled to the clutch inner together with the movable cam member with the boss portions inserted in the openings.

Further, according to the embodiment of the present invention, the clutch apparatus has a seventh characteristic in that, in addition to the configuration of any one of the first to sixth characteristics, on an annular plate portion opposing, from the opposite side to the first ring plate portion, to the second ring plate portion of the fixed cam member so as to move in response to movement of the movable cam member by accelerated rotation of the clutch inner, a plurality of second boss portions are disposed between the boss portions in a circumferential direction of the pressing plate and provided so as to penetrate the pressing plate in the axial direction; a second spring receiving plate is fixed to an end of the second boss portions so as to be disposed on an outer side with respect to an axially outer side end face of the pressing plate and formed so as to partly overlap with the pressing plate while surrounding the spring receiving plate as viewed in the axial direction; and a plurality of second clutch springs is provided between the second spring receiving plate and the pressing plate to bias the pressing plate so as to cooperate with the pressure receiving plate to press the driving friction plates and the driven friction plates against each other therebetween.

Further, according to the embodiment of the present invention, the clutch apparatus has an eight characteristic in that, in addition to the configuration of the seventh characteristic, a cylindrical projection is provided in a projecting manner on the spring receiving plate, which is fixed to an end of the boss portions extending in the axial direction from the first ring plate portion of the clutch inner, so as to abut with the end of each of the boss portions.

Further, according to the embodiment of the present invention, the clutch apparatus has a ninth characteristic in that, in addition to the configuration of any one of the first to eighth characteristics, a disc spring and a ring washer are provided between opposing portions of the first ring plate portion of the clutch inner and the clutch outer such that the ring washer is interposed between the disc spring and the clutch outer, and a clip is mounted on the clutch inner so as to prevent removal of the disc spring from the clutch inner.

With the first characteristic of the embodiment of the present invention, the swollen portion is provided integrally at the base portion of each of the boss portions provided on the first ring plate portion of the clutch inner such that it projects to the opposite sides of the boss portion of the clutch inner in the circumferential direction. When the phase between the fixed cam member and the movable cam member is displaced from the correct phase, the swollen portion is abutted with the end edge of the opening along the circumferential direction of the fixed cam member to prevent insertion of the boss portion into the opening. Consequently, erroneous assembly can be let known to the worker, by which the workability is improved.

With the second characteristic of the embodiment of the present invention, the toothless portion is provided on one of the clutch inner and the movable cam member while the increased width tooth is provided on the other of the clutch inner and the movable cam member so as to mesh with the toothless portion. Therefore, assembly wherein the phase of the movable cam member and the clutch inner in the direction of rotation is correct can be carried out. Consequently, the assembly operation is facilitated.

With the third characteristic of the embodiment of the present invention, the toothless portion positioned on the straight line interconnecting the center axial line of the fixed cam member and one of the openings is provided on the movable cam member. Therefore, when the worker can easily confirm that the phase in the direction of rotation is correct when the fixed cam member is assembled to the movable cam member. Consequently, the assembly operation is facilitated.

With the fourth characteristic of the embodiment of the present invention, the worker can visually recognize that the phase of the cam mechanism in the assembled state of the clutch apparatus is correct. Consequently, the assembly operation can be facilitated further.

With the fifth characteristic of the embodiment of the present invention, even if a phase displacement smaller than the circumferential pitch of the spline teeth for allowing the spline-coupling between the clutch inner and the movable cam member appears between the fixed cam member and the clutch inner, assembly of the fixed cam member to the clutch inner side cannot be carried out. Therefore, erroneous assembly can be let known to the worker, resulting in improvement in operability.

With the sixth characteristic of the embodiment of the present invention, in the state in which the fixed cam member is assembled to the clutch inner together with the movable cam member with the boss portions inserted in the openings, projection of the swollen portion from the second ring plate portion of the fixed cam member to the opposite side to the first ring plate portion is prevented. Therefore, even if a member which is disposed on the opposite side to the first ring plate portion with respect to the second ring plate portion is disposed in the proximity of the second ring plate portion, it does not interfere. with the swollen portion. This can contribute to compactification of the clutch apparatus in the axial direction.

With the seventh characteristic of the embodiment of the present invention, the plural second boss portions are provided on the annular plate portion opposed to the second ring plate portion from the opposite side to the first ring plate portion so as to extend in the axial direction and penetrate the pressing plate. Further, the second spring receiving plate disposed on the outer side with respect to the axially outer side end face of the pressing plate and formed so as to partly overlap with the pressing plate and surround the spring receiving plate fixed to the end portion of the boss portions provided on the clutch inner as viewed in the axial direction is fixed to the end of the second boss portions. Therefore, even if the worker tries to assemble the second spring receiving plate to the boss portions of the clutch inner in error, the second spring receiving plate is abutted with the pressing plate to prevent the assembly. Therefore, the erroneous assembly can be let known to the worker, resulting in improvement in operability.

Further, with the eighth characteristic of the embodiment of the present invention, the cylindrical projection provided on the spring receiving plate attached to the end of the boss portions extending in the axial direction from the first ring plate portion of the clutch inner is abutted with the end of the boss portions. Therefore, combination of the parts can be confirmed with the eyes, resulting in improvement in operability.

Furthermore, with the ninth characteristic of the embodiment of the present invention, the disc spring and the ring washer are provided between the opposing portions of the first ring plate portion and the clutch outer. Therefore, a fluttering in the axial direction of the clutch inner and the clutch outer can be suppressed. Further, it can be prevented by the clip that the disc spring drops when the assembly including the clutch inner is to be assembled to the clutch outer side.

Obviously, numerous modifications and variations of the present invention are possible in light of the above teachings. It is therefore to be understood that within the scope of the appended claims, the invention may be practiced otherwise than as specifically described herein.

What is claimed is:

1. A clutch apparatus, comprising:
   a clutch outer connected to an input power member;
   a clutch inner having a first ring plate portion extending along a plane perpendicular to an axial line of an output power shaft and a plurality of boss portions extending in an axial direction from the first ring plate portion and connected in an interlocking relationship to the output power shaft;
   a plurality of driving friction plates configured to be engaged by the clutch outer;
   a plurality of driven friction plates disposed alternately with the driving friction plates and configured to be engaged by the clutch inner;
   a pressure receiving plate disposed in an opposing relationship to that one of the driving friction plates and the driven friction plates which is disposed at one end of the clutch inner along the axial direction and coupled to the clutch inner;
   a pressing plate cooperating with the pressure receiving plate to sandwich the driving friction plates and the driven friction plates therebetween;
   a movable cam member spline-coupled to the clutch inner against relative rotation but for axial movement;
   a fixed cam member fixed to the output power shaft so as to cooperate with the movable cam member to configure a cam mechanism and having a second ring plate portion which is opposed to the first ring plate portion and has a plurality of openings which are provided therein so as to allow the boss portions to penetrate the second ring plate portion therethrough; and
   a plurality of first clutch springs provided between a first spring receiving plate fixed to an end portion of the boss portions and the pressing plate and configured to bias the pressing plate so as to cooperate with the pressure receiving plate to contact the driving friction plates and the driven friction plates under pressure with each other therebetween;
   a swollen portion being provided integrally at a base portion of each of the boss portions in such a manner as to be swollen to opposite sides from the boss portion along a circumferential direction of the clutch inner such that, in a state in which a phase between the fixed cam member and the movable cam member is displaced from a correct phase, the swollen portion abuts with an end edge of the associated opening along a circumferential direction of the fixed cam member thereby to prevent insertion of the associated boss portion into the opening,
   wherein the plurality of boss portions each have a cylindrical shape with an axis extending in the axial direction, and
   wherein the swollen portion protrudes from a side of the cylindrical shape of the respective boss portion in the circumferential direction of the clutch inner.

2. The clutch apparatus according to claim 1, wherein a toothless portion is provided on one of the clutch inner and the movable cam member by cutting out part of a plurality of spline teeth for allowing spline-coupling of the clutch inner and the movable cam member to each other, and an increased width tooth is provided on the other of the clutch inner and the movable cam member and has an increased width in the circumferential direction of the clutch inner so as to mesh with the toothless portion.

3. The clutch apparatus according to claim 2, wherein the toothless portion is provided on the movable cam member so as to be positioned on a straight line interconnecting a center of the fixed cam member and a center of one of the openings.

4. The clutch apparatus according to claim 3, wherein the toothless portion, the increased width tooth, a center of the boss portions, and the center of one of the openings are set so as to be juxtaposed on the same straight line in a state in which the fixed cam member and the movable cam member have a predetermined relative phase therebetween.

5. The clutch apparatus according to claim 1, wherein a distance between an end edge of each of the openings along the circumferential direction of the fixed cam member and the associated swollen portion in a state in which the boss portions is disposed on the center of the opening along the circumferential direction is set smaller than a circumferential pitch of a plurality of spline teeth for allowing spline-coupling between the clutch inner and the movable cam member.

6. The clutch apparatus according to claim 1, wherein the swollen portion is formed so as not to project to an opposite side to the first ring plate portion from the second ring plate portion of the fixed cam member in a state in which the fixed cam member is assembled to the clutch inner together with the movable cam member with the boss portions inserted in the openings.

7. The clutch apparatus according to claim 1, wherein, on an annular plate portion opposing, from the opposite side to the first ring plate portion, to the second ring plate portion of the fixed cam member so as to move in response to movement of the movable cam member by accelerated rotation of the clutch inner, a plurality of second boss portions are disposed between the boss portions in a circumferential direction of the pressing plate and provided so as to penetrate the pressing plate in the axial direction; a second spring receiving plate is fixed to an end of the second boss portions so as to be disposed on an outer side with respect to an axially outer side end face of the pressing plate and formed so as to partly overlap with the pressing plate while surrounding the first spring receiving plate as viewed in the axial direction; and a plurality of second clutch springs is provided between the second spring receiving plate and the pressing plate to bias the pressing plate so as to cooperate with the pressure receiving plate to press the driving friction plates and the driven friction plates against each other therebetween.

8. The clutch apparatus according to claim 7, wherein a cylindrical projection is provided in a projecting manner on the first spring receiving plate, which is fixed to an end of the boss portions extending in the axial direction from the first ring plate portion of the clutch inner, so as to abut with the end of each of the boss portions.

9. The clutch apparatus according to claim 1, wherein a disc spring and a ring washer are provided between opposing portions of the first ring plate portion of the clutch inner and the clutch outer such that the ring washer is interposed between the disc spring and the clutch outer, and a clip is mounted on the clutch inner so as to prevent removal of the disc spring from the clutch inner.

10. A clutch apparatus comprising:
a clutch outer connected to an input power member;
a clutch inner having a first ring plate portion extending along a plane perpendicular to an axial direction of an output power shaft and boss portions extending in the axial direction from the first ring plate portion, the clutch inner being connected to the output power shaft to rotate with the output power shaft;
driving friction plates connected to the clutch outer;
driven friction plates connected to the clutch inner, the driving friction plates and the driven friction plates being disposed alternately in the axial direction;
a pressure receiving plate coupled to the clutch inner and disposed to face one of the driving friction plates and the driven friction plates in the axial direction, said one being disposed at one end of the clutch inner along the axial direction;
a pressing plate provided to sandwich the driving friction plates and the driven friction plates between the pressing plate and the pressure receiving plate in the axial direction;
a movable cam member spline-coupled to the clutch inner such that the movable cam member move in the axial direction and do not rotate with respect to the clutch inner;
a fixed cam member fixed to the output power shaft so as to cooperate with the movable cam member to constitute a cam mechanism and having a second ring plate portion which faces the first ring plate portion in the axial direction and has openings through which the boss portions pass in the axial direction;
first clutch springs provided between a first spring receiving plate fixed to an end portion of the boss portions in the axial direction and the pressing plate and configured to press the pressing plate such that the driving friction plates and the driven friction plates contact to each other under pressure between the pressing plate and the pressure receiving plate; and
a swollen portion provided at a base portion of each of the boss portions and swollen from opposite sides of each of the boss portions along a circumferential direction of the clutch inner such that the swollen portion of an associated boss portion among the boss portions abuts with an end edge of an associated opening among the openings along a circumferential direction of the fixed cam member to prevent insertion of the associated boss portion into the associated opening in a state in which a phase between the fixed cam member and the movable cam member is displaced from a correct phase,
wherein the boss portions each have a cylindrical shape with an axis extending in the axial direction, and
wherein the swollen portion protrudes from a side of the cylindrical shape of the respective boss portion in the circumferential direction of the clutch inner.

11. The clutch apparatus according to claim 10,
wherein a toothless portion is provided on one of the clutch inner and the movable cam member by cutting out part of spline teeth for allowing spline-coupling of the clutch inner and the movable cam member to each other, and
wherein an increased width tooth is provided on another of the clutch inner and the movable cam member and has an increased width in a circumferential direction of the clutch inner so as to mesh with the toothless portion.

12. The clutch apparatus according to claim 11,
wherein the toothless portion is provided on the movable cam member so as to be positioned on a straight line interconnecting a center of the fixed cam member and a center of one of the openings.

13. The clutch apparatus according to claim 12,
wherein the toothless portion, the increased width tooth, a center of one of the boss portions, and a center of one of the openings are set so as to be juxtaposed on a same straight line in a state in which the fixed cam member and the movable cam member have a predetermined relative phase between the fixed cam member and the movable cam member.

14. The clutch apparatus according to claim 10,
wherein a distance between the end edge of the associated opening along the circumferential direction of the fixed cam member and the swollen portion of the associated boss portion is set smaller than a circumferential pitch of spline teeth for allowing spline-coupling between the clutch inner and the movable cam member in a state in which the associated boss portion is disposed on a center of the associated opening along the circumferential direction.

15. The clutch apparatus according to claim 10,
wherein the swollen portion is provided so as not to project to an opposite side to the first ring plate portion from the second ring plate portion of the fixed cam member in a state in which the fixed cam member is assembled to the clutch inner together with the movable cam member with the boss portions inserted in the openings.

16. The clutch apparatus according to claim 10,
wherein, on an annular plate portion facing the second ring plate portion of the fixed cam member from an opposite side to the first ring plate portion so as to move in response to movement of the movable cam member caused by accelerated rotation of the clutch inner, second boss portions are disposed between the boss portions in a circumferential direction of the pressing plate and provided so as to penetrate the pressing plate in the axial direction, wherein a second spring receiving plate is fixed to an end of the second boss portions so as to be disposed on an outer side with respect to an axially outer side end face of the pressing plate and provided so as to partly overlap with the pressing plate while surrounding the first spring receiving plate when viewed in the axial direction, and wherein second clutch springs are provided between the second spring receiving plate and the pressing plate to press the pressing plate so as to cooperate with the pressure receiving plate to press the driving friction plates and the driven friction plates against each other between the pressing plate and the pressure receiving plate.

17. The clutch apparatus according to claim 16, wherein a cylindrical projection is provided in a projecting manner on the first spring receiving plate, which is fixed to an end of the boss portions extending in the axial direction from the first ring plate portion of the clutch inner, so as to abut with the end of each of the boss portions.

18. The clutch apparatus according to claim 16, wherein the first clutch springs are made of a wire material thicker than a wire material of the second clutch springs, and wherein a length of the first clutch springs is smaller than a length of the second clutch springs in the axial direction.

19. The clutch apparatus according to claim 10, wherein a disc spring and a ring washer are provided between opposing portions of the first ring plate portion of the clutch inner and the clutch outer such that the ring washer is interposed between the disc spring and the clutch outer, and wherein a clip is mounted on the clutch inner so as to prevent removal of the disc spring from the clutch inner.

20. The clutch apparatus according to claim 16, wherein a thickness of the second spring receiving plate is smaller than a thickness of the first spring receiving plate in the axial direction.

* * * * *